(12) United States Patent
Huang et al.

(10) Patent No.: US 11,603,804 B2
(45) Date of Patent: Mar. 14, 2023

(54) CONTROL SYSTEM OF ELECTRONIC-CONTROLLED OIL-GAS DUAL FUEL ENGINE

(71) Applicants: Zichai Machinery Co., Ltd., Zibo (CN); Zichai Power Co., Ltd., Zibo (CN)

(72) Inventors: Meng Huang, Zibo (CN); Qiangzhi Xin, Zibo (CN); Baofu Jia, Zibo (CN); Yanrui Wang, Zibo (CN); Shanggang Yang, Zibo (CN); Hongxiang Zhang, Zibo (CN); Li Yan, Zibo (CN); Lei Yuan, Zibo (CN); Xinliang Zhang, Zibo (CN); Jin Guo, Zibo (CN); Lihong Sun, Zibo (CN); Gaojie Wang, Zibo (CN); Hongxia Zhang, Zibo (CN); Ying Zhang, Zibo (CN); Hui Zhao, Zibo (CN); Juan Li, Zibo (CN); Xigao Wang, Zibo (CN)

(73) Assignees: Zichai Machinery Co., Ltd., Zibo (CN); Zichai Power Co., Ltd., Zibo (CN)

( * ) Notice: Subject to any disclaimer, the term of this patent is extended or adjusted under 35 U.S.C. 154(b) by 0 days.

(21) Appl. No.: 17/547,356

(22) Filed: Dec. 10, 2021

(65) Prior Publication Data
US 2022/0364518 A1 Nov. 17, 2022

(30) Foreign Application Priority Data
May 14, 2021 (CN) .......................... 202110529104.1

(51) Int. Cl.
*F02D 19/06* (2006.01)
*F02D 41/38* (2006.01)

(52) U.S. Cl.
CPC ..... *F02D 19/0615* (2013.01); *F02D 19/0647* (2013.01); *F02D 41/3827* (2013.01)

(58) Field of Classification Search
CPC .................. F02D 19/0647; F02D 19/0615
See application file for complete search history.

(56) References Cited

U.S. PATENT DOCUMENTS

| | | | |
|---|---|---|---|
| 10,690,107 B1 * | 6/2020 | Anders | .................. F02M 57/06 |
| 2010/0147262 A1 * | 6/2010 | Martin | ................ F02D 41/0025 123/299 |
| 2014/0074380 A1 * | 3/2014 | Fisher | ................ F02D 41/0025 701/104 |

OTHER PUBLICATIONS

Automotive System, "How Oxygen Sensor Works," https://youtu.be/Fl3aD1qJrEg, Sep. 13, 2013 (Year: 2013).*

(Continued)

*Primary Examiner* — Kevin A Lathers
(74) *Attorney, Agent, or Firm* — Fox Rothschild LLP

(57) ABSTRACT

A control system of an electronic-controlled oil-gas dual fuel engine includes electronic control pumps, fuel gas injection electromagnetic valves, a fuel gas control device and a fuel oil control device. The fuel gas control device and the fuel oil control device are electrically connected with a control device of the engine. The fuel gas control device is electrically connected with the fuel gas injection electromagnetic valves and controls the opening time and the opening duration of each fuel gas injection electromagnetic valve installed on a pipeline between a natural gas rail and a cylinder cover air inlet channel of the engine. The fuel oil control device is electrically connected with the electronic control pumps, and controls the starting time and the operation duration of the electronic control pump, and the electronic control pumps are installed on a pipeline between an engine fuel oil rail and a cylinder cover fuel injector.

20 Claims, 1 Drawing Sheet

(56) References Cited

OTHER PUBLICATIONS

O'Reilly Auto Parts, "How to: Replace a Camshaft Position Sensor", htttps://youtu.be/Ul48UCygtlw, Sep. 12, 2019 (Year: 2019).*

* cited by examiner

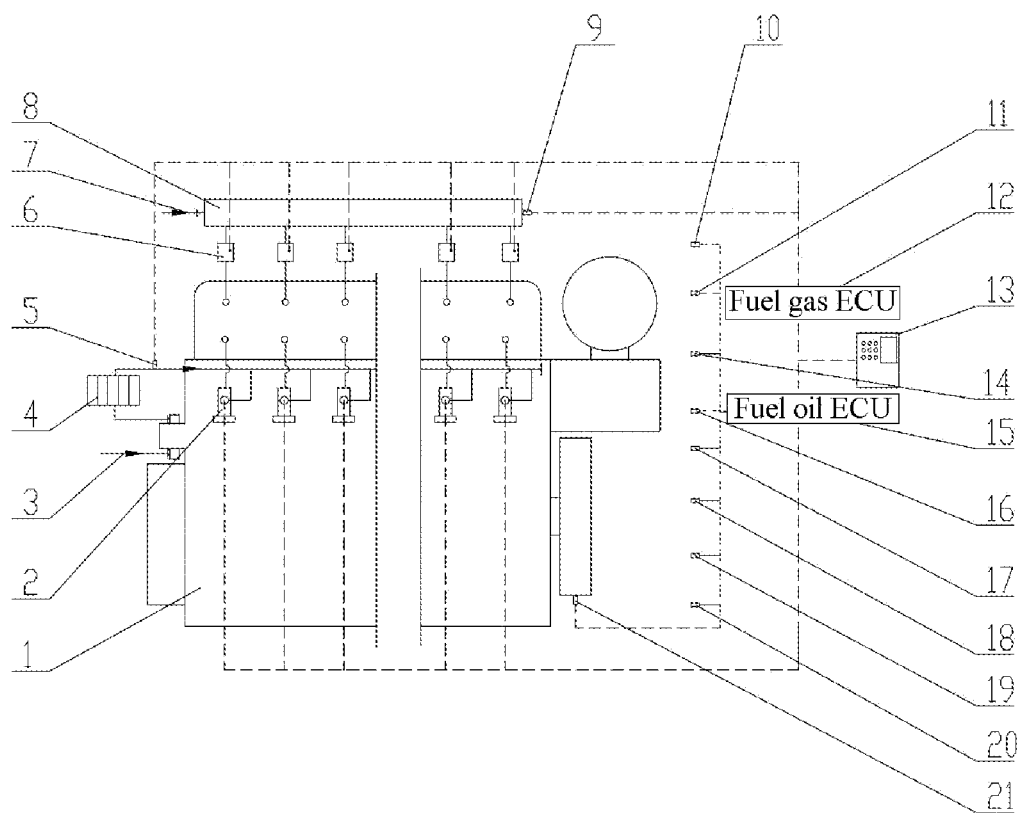

CONTROL SYSTEM OF ELECTRONIC-CONTROLLED OIL-GAS DUAL FUEL ENGINE

CROSS REFERENCE TO RELATED APPLICATION

This patent application claims the benefit and priority of Chinese Patent Application No. 202110529104.1, filed on May 14, 2021, the disclosure of which is incorporated by reference herein in its entirety as part of the present application.

TECHNICAL FIELD

The present disclosure belongs to the technical field of marine LNG/diesel oil dual fuel engines, and specifically relates to a control system of an electronic-controlled oil-gas dual fuel engine.

BACKGROUND ART

With the increasingly strict emission regulations and the increasingly short world energy, high efficiency, energy conservation and environmental protection become leading directions of the technical development of internal combustion engines. Liquefied natural gas (LNG) has the characteristics of high energy density, low emission, convenience in transportation and the like, and is considered as engine clean fuel with the highest development prospect. With the popularization of clean fuel in the country, a dual fuel engine is developed. The dual fuel engine refers to an internal combustion engine which can take natural gas as fuel and can also burn diesel oil or burn fuel oil and natural gas fuel at the same time.

At present, for a traditional marine dual fuel engine, a fuel gas inlet system, a fuel gas control system and necessary security measures are additionally arranged on a mechanical pump diesel engine. The dual fuel engine mainly works in a diesel mode, and the dual-fuel mode is that diesel oil mixed with the natural gas is burned by adopting a method of letting gas in and oil out on the basis of the diesel engine. The diesel mode of the engine is controlled by a mechanical pump, combustion in the engine at a low load is not uniform, the engine can enter a dual-fuel mode above 25% of Maximum Continuous Rating according to the propelling characteristic of a propeller, and the substitution rate is only about 70%. The dual-fuel mode of the engine is low in heat efficiency and poor in emission, which cannot meet the requirements for the latest emission standard of the marine engine.

SUMMARY

A technical problem to be solved by the present disclosure is to overcome the defects in the prior art, and a control system of an electronic-controlled oil-gas dual fuel engine is provided. According to the present disclosure, fuel supply for the engine in a fuel oil mode and a fuel gas mode can be controlled accurately, and combustion in the engine is uniform at all operating points.

The technical scheme adopted for solving the problem existing in the prior art is as follows.

A control system of an electronic-controlled oil-gas dual fuel engine, includes electronic control pumps, fuel gas injection electromagnetic valves, a fuel gas control device and a fuel oil control device which are fixed on the engine and work cooperatively.

The fuel gas control device and the fuel oil control device are electrically connected with a control device of the engine.

The fuel gas control device is electrically connected with the fuel gas injection electromagnetic valves, and controls an opening time and an opening duration of each fuel gas injection electromagnetic valve, and the fuel gas injection electromagnetic valves are installed on a pipeline between a natural gas rail and a cylinder cover air inlet channel of the engine.

The fuel oil control device is electrically connected with the electronic control pumps, and controls a starting time and an operation duration of each electronic control pump, and the electronic control pumps are installed on a pipeline between an engine fuel oil rail and a cylinder cover fuel injector.

In some embodiments, a control unit of the control device of the engine is an Electronic Control Unit (ECU), and sensors on the engine are all electrically connected with the control device of the engine.

In some embodiments, the sensors on the engine include a fuel oil temperature and pressure sensor, a natural gas temperature and pressure sensor, a cam phase sensor, a supercharging pressure and temperature sensor, an exhaust temperature sensor of each cylinder, a water temperature sensor, an engine oil pressure sensor, a rotating speed sensor and a crankshaft phase sensor.

In some embodiments, a knock sensor is installed on an engine cylinder cover.

In some embodiments, bearing temperature sensors are installed on bearings at all gears of a crankshaft of the engine, respectively.

In some embodiments, an oxygen sensor is installed on an exhaust pipe of the engine.

In some embodiments, the fuel gas control device and the fuel oil control device work cooperatively in a CAN communication mode.

In some embodiments, the fuel gas control device controls the fuel gas injection electromagnetic valves according to a fuel gas calibration map.

In some embodiments, the fuel oil control device controls the starting time and the operation duration of the electronic control pump according to a fuel oil calibration map.

In some embodiments, control units of the fuel gas control device and the fuel oil control device are ECUs.

Compared with the prior art, the present disclosure has the following beneficial effects.

1. Through full-operating-condition calibration of the fuel oil map and the fuel gas map of the engine and cooperation of the fuel oil ECU and the fuel gas ECU, fuel supply to the engine in a fuel oil mode and a fuel gas mode can be controlled accurately, and combustion in the engine is uniform at all operating points.

2. In addition, through cooperatively and accurately controlling injection of fuel oil and fuel gas in a dual-fuel mode, the problem of low substitution rate in the dual-fuel mode is solved, and the highest substitution rate reaches 90%.

3. The problem of non-uniform combustion at a low load in a diesel mode is solved, and the engine in a dual-fuel operation mode is operated under 10% of Maximum Continuous Rating (MCR), preferably under 6.4% of MCR.

4. The functions of detection and protection of the engine in an operating state and intelligent switching of operating 6 modes are realized.

5. The emission of the engine meets the limit value requirements at the second-stage of GB15097-2016 "Limits and measurement methods for exhaust pollutants from marine engines (China I, II)".

BRIEF DESCRIPTION OF THE DRAWINGS

The present disclosure is further described in conjunction with the attached drawings and the embodiments.

FIG. 1 is a diagram showing a control system of an electronic-controlled oil-gas dual fuel engine according to the present disclosure.

List of reference numbers: 1 engine; 2 electronic control pump; 3 fuel oil inlet pipe; 4 fuel oil filter; 5 fuel oil temperature and pressure sensor; 6 fuel gas injection valve; 7 natural gas inlet pipe; 8 natural gas rail; 9 natural gas temperature and pressure sensor; 10 cam phase sensor; 11 supercharging pressure and temperature sensor; 12 fuel gas control device; 13 engine monitoring instrument; 14 knock sensor; 15 fuel oil control device; 16 exhaust temperature sensor of each cylinder; 17 water temperature sensor; 18 engine oil pressure sensor; 19 bearing temperature sensor; 20 oxygen sensor; and 21 rotating speed sensor and crankshaft phase sensor.

DETAILED DESCRIPTION OF THE EMBODIMENTS

FIG. 1 is an optimal embodiment of a control system of an electronic-controlled oil-gas dual fuel engine, and the present disclosure is further described in detail in conjunction with the attached drawings.

As shown in FIG. 1, the control system of the electronic-controlled oil-gas dual fuel engine includes electronic control pumps 2, fuel gas injection electromagnetic valves 6, a fuel gas control device 12 and a fuel oil control device 15 which are fixed on an engine 1. The fuel gas control device 12 and the fuel oil control device 15 work cooperatively in a CAN communication mode.

The fuel gas control device 12 and the fuel oil control device 15 are electrically connected with a control device of the engine, and control units of the fuel gas control unit 12, the fuel oil control device 15 and the engine control device are ECUs.

The fuel gas control device 12 is electrically connected with the fuel gas injection electromagnetic valves 6 through communication wire harnesses, the fuel gas control device 12 controls the opening time and the opening duration of the fuel gas injection electromagnetic valves 6 according to a calibration map, and the fuel gas injection electromagnetic valves 6 are installed on a pipeline between a natural gas rail 8 and a cylinder cover air inlet channel of the engine 1.

The fuel oil control device 15 is electrically connected with the electronic control pumps 2 through communication wire harnesses, the fuel oil control device 15 controls the starting time and the operation duration of the electronic control pumps 2 according to the calibration map, and the electronic control pumps 2 are installed on a pipeline between an engine fuel oil rail and a cylinder cover fuel injector.

An oil supply angle of a traditional mechanical pump dual fuel engine in a pure diesel mode is constant, an oil supply angle in a dual-fuel mode is the oil supply angle in the pure diesel mode, the constant oil supply angle cannot facilitate combustion of the natural gas in the dual-fuel mode. According to the embodiment, a mechanical pump is replaced by the electronic control pump 2, in combination with the map calibration of full load points in the pure diesel mode, accurate control over a fuel oil mode and a fuel gas mode is achieved, and combustion in the engine under full working conditions is optimized.

The ECU control maps of the fuel oil control device 15 mainly include an oil quantity control map, an oil supply timing control map, a start-up oil quantity control map, an idle PID control map, an excessive process control map, a fuel oil temperature correction map and an atmospheric press temperature correction map.

Sensors on the engine 1 include a fuel oil temperature and pressure sensor 5, a natural gas temperature and pressure sensor 9, a cam phase sensor 10, a supercharging pressure and temperature sensor 11, an exhaust temperature sensor of each cylinder 16, a water temperature sensor 17, an engine oil pressure sensor 18, a rotating speed sensor and a crankshaft phase sensor 21.

The fuel oil temperature and pressure sensor 5 is provided at an outlet of the fuel oil filter 4, and an inlet of the fuel oil filter 4 is connected with the fuel oil inlet pipe 3. The natural gas temperature and pressure sensor 9 is installed on the natural gas rail 8, and an inlet of the natural gas rail 8 is connected with the natural gas inlet pipe 7. The cam phase sensor 10 is configured for detecting intake and exhaust cam phases of all cylinders of the engine. The supercharging pressure and temperature sensor 11 is configured for detecting the air inlet pressure and temperature of each cylinder. The temperature sensor of each cylinder 16 is installed on an exhaust pipe of each cylinder and configured for detecting the exhaust temperature, the fuel oil injection amount is controlled through a fuel oil ECU, the fuel gas injection amount is controlled through a fuel gas ECU, so that the fuel injection amount of each cylinder is corrected, and uniform combustion in each cylinder is cooperatively controlled. The water temperature sensor 17 is configured for detecting the temperature of cooling water; the engine oil pressure sensor 18 is configured for detecting the engine oil pressure of lubricating oil. The rotating speed sensor is installed at a flywheel and configured for detecting the rotating speed of the engine. The crankshaft phase sensor 21 is configured for detecting the phase of a crankshaft. The sensors on the engine 1 are electrically connected with the engine control device through communication wire harnesses. Furthermore, an engine monitoring instrument 13 is installed on the engine 1 or in other areas outside the engine 1, and the engine monitoring instrument 13 communicates with an engine ECU. The sensors collect the operating state of the engine and then the collected operating state is displayed on the engine monitoring instrument 13, and the engine monitoring instrument 13 also has the functions of mode switching (namely switching between a fuel oil mode and a dual-fuel mode) and adjustment of engine acceleration and deceleration.

Data collected by all the sensors are compared with all the calibration maps, then based on the collected data, the engine ECU, the fuel gas control device 12 and the fuel oil control device 15 automatically control switching between the fuel oil mode and the dual-fuel mode and the states of the electronic control pumps 2 and the fuel gas injection electromagnetic valves 6. The present disclosure changes the situation in which a traditional dual fuel engine is mainly in a pure diesel mode. In the present disclosure, the dual fuel engine can operate independently in the pure diesel mode and the dual-fuel mode, and different operating modes can be switched intelligently. Furthermore, the operating mode can be switched to the dual-fuel mode under a low-load condition of the engine, the lowest load point when the engine enters the dual-fuel mode is 10% of Maximum Continuous Rating of the engine, preferably 6.4% of MCR of the engine, thereby increasing the working condition substitution rate under the dual-fuel mode.

A knock sensor 14 is installed on the engine cylinder cover, and in the embodiment, the knock sensor 14 is installed on a fastening bolt of the cylinder cover and configured for detecting the combustion condition in the cylinder. Through the data detected by the knock sensor 14, the engine ECU, the fuel gas control device 12 and the fuel oil control device 15 adjust the oil injection amount and the gas injection amount, so as to adjust the combustion condition in the air cylinder, thereby reducing and eliminating the knock condition.

Bearing temperature sensors 19 are installed on bearings of all gears of a crankshaft of the engine 1, respectively, and configured for detecting the temperatures of the bearings of all gears; when the temperature of the bearing rises to a threshold value, the engine monitoring instrument 13 gives an alarm or stops for protection.

An oxygen sensor 20 is installed on an exhaust pipe of the engine 1. The oxygen sensor 20 is configured for detecting the oxygen content in exhaust gas to determine the air-fuel ratio, so that closed-loop control of the air-fuel ratio of the engine can be achieved.

Only the preferred embodiments of the present disclosure have been described in detail above, but the present disclosure is not limited to the embodiments described above, and various changes may be made within the knowledge of those skilled in the art without departing from the spirit of the present disclosure.

What is claimed is:

1. A control system of an electronic-controlled oil-gas dual fuel engine, comprising electronic control pumps and fuel gas injection electromagnetic valves, wherein
the control system further comprises a fuel gas control device and a fuel oil control device which are fixed on the engine and work cooperatively;
the fuel gas control device and the fuel oil control device are electrically connected with a control device of the engine;
the fuel gas control device is electrically connected with the fuel gas injection electromagnetic valves, and controls an opening time and an opening duration of each fuel gas injection electromagnetic valve, and the fuel gas injection electromagnetic valves are installed on a pipeline between a natural gas rail and a cylinder cover air inlet channel of the engine; and
the fuel oil control device is electrically connected with the electronic control pumps, and controls a starting time and an operation duration of each electronic control pump, and the electronic control pumps are installed on a pipeline between an engine fuel oil rail and a cylinder cover fuel injector.

2. The control system of the electronic-controlled oil-gas dual fuel engine according to claim 1, wherein
the fuel gas control device and the fuel oil control device work cooperatively in a CAN communication mode.

3. The control system of the electronic-controlled oil-gas dual fuel engine according to claim 1, wherein
the fuel gas control device controls the fuel gas injection electromagnetic valves according to a fuel gas calibration map.

4. The control system of the electronic-controlled oil-gas dual fuel engine according to claim 1, wherein
the fuel oil control device controls the starting time and the operation duration of the electronic control pump according to a fuel oil calibration map.

5. The control system of the electronic-controlled oil-gas dual fuel engine according to claim 1, wherein
control units of the fuel gas control device and the fuel oil control device are ECUs.

6. The control system of the electronic-controlled oil-gas dual fuel engine according to claim 1, wherein
a control unit of the control device of the engine is an Electronic Control Unit (ECU), and sensors on the engine are all electrically connected with the control device of the engine.

7. The control system of the electronic-controlled oil-gas dual fuel engine according to claim 2, wherein
a knock sensor is installed on an engine cylinder cover, and configured for detecting combustion condition in the cylinder.

8. The control system of the electronic-controlled oil-gas dual fuel engine according to claim 6, wherein
bearing temperature sensors are installed on bearings at all gears of a crankshaft of the engine, respectively, and configured for detecting temperatures of the bearings of all gears.

9. The control system of the electronic-controlled oil-gas dual fuel engine according to claim 6, wherein
an oxygen sensor is installed on an exhaust pipe of the engine, and
configured for detecting oxygen content in exhaust gas to determine an air-fuel ratio, so that closed-loop control of the air-fuel ratio of the engine is achieved.

10. The control system of the electronic-controlled oil-gas dual fuel engine according to claim 6, wherein
the fuel gas control device and the fuel oil control device work cooperatively in a CAN communication mode.

11. The control system of the electronic-controlled oil-gas dual fuel engine according to claim 2, wherein
the fuel gas control device controls the fuel gas injection electromagnetic valves according to a fuel gas calibration map.

12. The control system of the electronic-controlled oil-gas dual fuel engine according to claim 2, wherein
the fuel oil control device controls the starting time and the operation duration of the electronic control pump according to a fuel oil calibration map.

13. The control system of the electronic-controlled oil-gas dual fuel engine according to claim 6, wherein
control units of the fuel gas control device and the fuel oil control device are ECUs.

14. The control system of the electronic-controlled oil-gas dual fuel engine according to claim 2, wherein
the sensors on the engine comprise a fuel oil temperature and pressure sensor, a natural gas temperature and pressure sensor, a cam phase sensor, a supercharging pressure and temperature sensor, an exhaust temperature sensor of each cylinder, a water temperature sensor, an engine oil pressure sensor, a rotating speed sensor and a crankshaft phase sensor;
wherein:
the fuel oil temperature and pressure sensor is provided at an outlet of a fuel oil filter, and an inlet of the fuel oil filter is connected with a fuel oil inlet pipe;
the natural gas temperature and pressure sensor is installed on the natural gas rail, and an inlet of the natural gas rail is connected with a natural gas inlet pipe;

the cam phase sensor is configured for detecting intake and exhaust cam phases of all cylinders of the engine;

the supercharging pressure and temperature sensor is configured for detecting an air inlet pressure and temperature of each cylinder;

the exhaust temperature sensor of each cylinder is installed on an exhaust pipe of each cylinder and configured for detecting exhaust temperature;

the water temperature sensor is configured for detecting a temperature of cooling water;

the engine oil pressure sensor is configured for detecting an engine oil pressure of lubricating oil;

the rotating speed sensor is installed at a flywheel and configured for detecting a rotating speed of the engine; and the crankshaft phase sensor is configured for detecting a phase of a crankshaft wherein:

an engine monitoring instrument is installed on the engine or in other areas outside the engine, and the engine monitoring instrument communicates with an engine ECU; and the sensors collect an operating state of the engine and then the operating state collected is displayed on the engine monitoring instrument.

15. The control system of the electronic-controlled oil-gas dual fuel engine according to claim 14, wherein a knock sensor is installed on an engine cylinder cover, and configured for detecting combustion condition in the cylinder.

16. The control system of the electronic-controlled oil-gas dual fuel engine according to claim 14, wherein bearing temperature sensors are installed on bearings at all gears of a crankshaft of the engine, respectively, and configured for detecting temperatures of the bearings of all gears.

17. The control system of the electronic-controlled oil-gas dual fuel engine according to claim 3, wherein an oxygen sensor is installed on an exhaust pipe of the engine, and configured for detecting oxygen content in exhaust gas to determine an air-fuel ratio, so that closed-loop control of the air-fuel ratio of the engine is achieved.

18. The control system of the electronic-controlled oil-gas dual fuel engine according to claim 14, wherein the fuel gas control device and the fuel oil control device work cooperatively in a CAN communication mode.

19. The control system of the electronic-controlled oil-gas dual fuel engine according to claim 14, wherein the fuel gas control device controls the fuel gas injection electromagnetic valves according to a fuel gas calibration map.

20. The control system of the electronic-controlled oil-gas dual fuel engine according to claim 6, wherein the fuel oil control device controls the starting time and the operation duration of the electronic control pump according to a fuel oil calibration map.

* * * * *